(12) United States Patent
Woellert et al.

(10) Patent No.: US 7,837,275 B2
(45) Date of Patent: Nov. 23, 2010

(54) ATTACHMENT MECHANISM WITH INTERLOCKED BELT RETRACTOR

(75) Inventors: Thomas Woellert, Union, OH (US); Guy Robert Dingman, Laura, OH (US); William Cameron Forbes, Springboro, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 36 days.

(21) Appl. No.: 12/148,761

(22) Filed: Apr. 22, 2008

(65) Prior Publication Data

US 2009/0065621 A1 Mar. 12, 2009

Related U.S. Application Data

(60) Provisional application No. 60/967,676, filed on Sep. 6, 2007.

(51) Int. Cl.
*A62B 35/00* (2006.01)

(52) U.S. Cl. ........................ 297/474; 297/253; 297/475; 297/476; 410/100; 410/103

(58) Field of Classification Search ................. 297/474, 297/475, 476, 253; 410/100, 103
See application file for complete search history.

(56) References Cited

U.S. PATENT DOCUMENTS

| | | | | |
|---|---|---|---|---|
| 3,765,700 | A | * | 10/1973 | Littmann ..................... 297/471 |
| 3,771,814 | A | | 11/1973 | Hahn |
| 4,720,148 | A | | 1/1988 | Anthony et al. |
| 5,380,066 | A | * | 1/1995 | Wiseman et al. ............ 297/476 |
| 5,516,199 | A | * | 5/1996 | Crook et al. ................ 297/468 |
| 5,524,944 | A | | 6/1996 | Berg |
| 5,779,319 | A | * | 7/1998 | Merrick ...................... 297/484 |
| 5,890,762 | A | | 4/1999 | Yoshida |
| 5,908,223 | A | | 6/1999 | Miller |
| 6,045,194 | A | * | 4/2000 | Kielwein et al. ............ 297/476 |
| 6,322,140 | B1 | | 11/2001 | Jessup et al. |
| 6,425,632 | B1 | | 7/2002 | Anthony et al. |
| 6,631,926 | B2 | | 10/2003 | Merrick et al. |
| 6,820,310 | B2 | | 11/2004 | Woodard et al. |
| 6,868,585 | B2 | | 3/2005 | Anthony et al. |
| 6,868,591 | B2 | | 3/2005 | Dingman et al. |
| 6,886,889 | B2 | | 5/2005 | Vits et al. |
| 6,962,394 | B2 | | 11/2005 | Anthony et al. |

(Continued)

FOREIGN PATENT DOCUMENTS

DE    198 48 231 A1    8/1999

(Continued)

*Primary Examiner*—Sang Kim
(74) *Attorney, Agent, or Firm*—Taft Stettinius & Hollister LLP

(57) ABSTRACT

A multi-mode belt retractor including an interlocked attachment mechanism. The belt retractor and attachment mechanism are physically integrated in a single unit. In one embodiment, the retractor is shifted between modes by the operation by the attachment mechanism such that securing the attachment mechanism to an anchor point shifts the belt retractor into a locked mode. Releasing the attachment mechanism from the anchor point shifts the belt retractor into a free-wheel mode. In one embodiment, only a single user-operable button is provided, thus minimizing the opportunity for improper operation. One embodiment of the attachment mechanism is symmetrical, making it operable by a user's left or right hand.

23 Claims, 12 Drawing Sheets

U.S. PATENT DOCUMENTS

| | | |
|---|---|---|
| 7,010,836 B2 | 3/2006 | Acton et al. |
| 7,029,067 B2 | 4/2006 | Vits et al. |
| 7,040,696 B2 | 5/2006 | Vits et al. |
| 7,077,475 B2 | 7/2006 | Boyle |
| 7,097,204 B2 | 8/2006 | Jessup et al. |
| 7,125,069 B2 | 10/2006 | Cacucci et al. |
| 7,144,085 B2 | 12/2006 | Vits et al. |
| 7,278,684 B2 | 10/2007 | Boyle |
| 7,338,120 B2 * | 3/2008 | Gastaldi .................... 297/253 |
| 2006/0082129 A1 | 4/2006 | Dingman et al. |
| 2006/0082200 A1 | 4/2006 | Woellert et al. |
| 2006/0255614 A1 | 11/2006 | Gray et al. |
| 2007/0040441 A1 | 2/2007 | Boyle et al. |
| 2007/0290535 A1 | 12/2007 | Meredith et al. |

FOREIGN PATENT DOCUMENTS

EP 0 982 182 A1 3/2000

* cited by examiner

ATTACHMENT MECHANISM WITH INTERLOCKED BELT RETRACTOR

CROSS REFERENCE TO RELATED APPLICATIONS

This application claims the benefit of U.S. Provisional Application No. 60/967,676, filed Sep. 6, 2007, which is incorporated by reference in its entirety.

BACKGROUND OF THE INVENTION

This invention relates to the field of child restraints for motor vehicles and to the field of devices used to attach child restraints to motor vehicles. More particularly, the present invention relates to devices for attaching child restraints to lower and upper anchors provided in motor vehicles specifically provided for the purpose of securing child restraints.

Child restraints for motor vehicles are widely used by operators of motor vehicles when traveling with children. Child restraints generally are formed from a plastic shell and may include padding and/or a harness. Child restraints are typically attached to a vehicle's seats using either the seatbelts provided on the vehicle's seats or by using an anchoring system provided specifically for use with child restraints. In the United States, most vehicles manufactured after Sep. 1, 2002, are required to include LATCH ("lower anchors and tethers for children") attachments which provide two lower anchors, one on each side of the seating position, and a tether anchor above and behind the seatback.

Many child restraints incorporating the LATCH system provide an attachment means consisting of segment of webbing that extends through a portion of the child restraint and extends beyond the seat on each side. Each end of the segment of webbing includes a clip designed to be connected to the respective lower LATCH anchor. Typically the segment of webbing also includes a buckle for shortening the overall length of the segment such that the child restraint is held tightly on the vehicle seat. While this method of attaching the child restraint may provide some advantages over securing the child restraint with the vehicle's seatbelts, it is sometimes inconvenient and difficult for the caregiver to tighten the webbing. Additionally, after the webbing is tightened, there may be a substantial tag end which may become inconvenient for other occupants of the vehicle.

Other child restraints incorporate retractor mechanisms designed to provide proper tension and to retract excess webbing between the child restraint and the LATCH anchors. See, e.g., U.S. Patent Application Publication No. 2006/0082129. While these child restraints address some of the disadvantages of other LATCH attachment mechanisms, other disadvantages remain. For example, when attaching the child restraint to a vehicle, the caregiver must depress one or more buttons on the child restraint in order to extend the web and connect the webbing to the LATCH anchors.

SUMMARY

According to the present invention, an attachment mechanism with an integrated belt retractor is provided.

In a first aspect, a connection assembly for a child restraint may include a connector, the connector being adapted to releasably couple to an attachment point; a retractor attached to the connector and including a spool; and a length of webbing, the length of webbing extending from the child restraint to the retractor and around the spool; wherein the attachment point is provided within a passenger compartment of a vehicle and is adapted for securing a child restraint within the vehicle.

In a detailed embodiment of the first aspect, the connector may be rigidly coupled to the retractor. The retractor and the connector may form an integrated unit. The retractor and the connector may be encased within a shell and the length of webbing may extend from the child restraint, through an opening in the shell, and to the retractor.

In another detailed embodiment of the first aspect, the connection assembly may further include a ratchet mechanism, the ratchet mechanism being operatively coupled to the retractor. The ratchet mechanism may include a pawl selectively engageable with a ratchet wheel such that the ratchet mechanism permits extension of the length of webbing from the retractor only when the pawl is disengaged from the ratchet wheel, the pawl disengaging from the at least one ratchet wheel when the length of webbing is fully retracted into the retractor and the pawl engaging the ratchet wheel after the length of webbing partially retracts into the retractor after being at least partially extended from the retractor. The connection assembly may further include a pawl paddle and a clutch plate having a cam, the pawl paddle being mounted adjacent to the spool such that the pawl paddle is moved to an open position by webbing accumulating on the spool when substantially all of the length of webbing is retracted onto the spool, the cam being operable to hold the pawl paddle in the open position while a portion of the length of webbing is withdrawn from the retractor and the cam disengaging from the pawl paddle and allowing the pawl paddle to shift to a locked position when the length of webbing is partially retracted onto the retractor. The pawl paddle may be connected to the pawl and the pawl may be disengaged from the ratchet wheel when the pawl paddle is in the open position and the pawl may be engaged with the ratchet wheel when the pawl paddle is in the locked position.

In another detailed embodiment of the first aspect, the connector may be articulable relative to the retractor about a joint located between the connector and the retractor. A centerline of the connector may be between 0 and 45 degrees offset from a centerline of the webbing.

In yet another detailed embodiment of the first aspect, the retractor may further include a first pin and a second pin, the first pin and the second pin being located such that the length of webbing extends from the spool, between the first pin and the second pin, and out of the retractor, wherein a distance between the first pin and the second pin is equal to a minimum spacing required to permit a single thickness of the webbing to slide freely between the first pin and the second pin.

In a second aspect, a connection assembly for a child restraint seat may include a length of webbing extending from a child restraint seat and terminating at a first end; a connection device including a retractor including a spool adapted to receive at least a portion of the length of webbing including the first end, and a first connector, the first connector being adapted to releasably couple the connection device to a first attachment point within a passenger compartment of a vehicle.

In a detailed embodiment of the second aspect, the retractor may be operable in a plurality of modes of operation, the modes of operation including a free-wheel mode and a lock mode, wherein in the free-wheel mode the retractor permits the portion of the length of webbing to be readily extended from the spool and in the lock mode the retractor prevents webbing from being extended from the spool. The connection assembly may further include an interlock operative to change the mode of operation of the retractor from the free-wheel mode to the lock mode when the first connector is coupled to the first attachment point. The connection assembly may further include a release button operative to change the mode of operation of the retractor from the lock mode to the free-wheel mode and adapted to release the first connector from the first attachment point. The length of webbing may have a first surface, a second surface, a first edge, and a second edge, and the first connector may be generally symmetric about a line extending from the first edge of the length of webbing to the second edge of the length of webbing. The retractor may further include a first pin and a second pin, the first pin and the second pin being located such that the length of webbing extends from the spool, between the first pin and the second pin, and out of the retractor, wherein a distance between the first pin and the second pin is equal to a minimum spacing required to permit a single thickness of the webbing to slide freely between the first pin and the second pin. The first connector may be articulable relative to the retractor about a joint located between the first connector and the retractor. A centerline of the connector may be between 0 and 45 degrees offset from a centerline of the length of webbing. The connection device may further include a second connector. The length of webbing may have a first end and a second end and the spool may be adapted to receive a portion of the length of webbing including the first end. The second connector may be adapted to releasably couple the second end of the length of webbing to a second attachment point. The attachment point and the second attachment point may be located within a vehicle proximate to both a seat portion and a seatback portion of a seat. The length of webbing between the retractor and the second connector may pass through a portion of a child restraint. The retractor may further include a first pin and a second pin, the first pin and the second pin being located such that the length of webbing extends from the spool, between the first pin and the second pin, and out of the retractor, wherein a distance between the first pin and the second pin is equal to a minimum spacing required to permit a single thickness of the webbing to slide freely between the first pin and the second pin.

In a third aspect, a connection device may include a retractor including a spool adapted to receive a length of webbing, the webbing having a centerline oriented in a direction along which webbing is withdrawn from the retractor; and a connector adapted to releasably couple the connection device to an attachment point and the connector having a centerline extending from a location where the connector is joined to the retractor towards the portion of the connector that couples with the attachment point; wherein the centerline of the connector is between 0 and 45 degrees offset from the centerline of the webbing.

In a detailed embodiment of the third aspect, the centerline of the connector may be between 20 and 30 degrees offset from the centerline of the webbing.

In a fourth aspect, a connection device may include a retractor including a spool adapted to receive a length of webbing; a connector adapted to releasably couple the connection device to an attachment point; and a cable release mechanism adapted to release the connector from the attachment point, the cable release mechanism including a handle, a length of cable, a fixed attachment point, and a slidable attachment point.

In a detailed embodiment of the fourth aspect, the handle may be located adjacent to the retractor.

In a fifth aspect, a connection device may include a frame; a spool mounted on the frame, the spool being adapted to receive a length of webbing; a first gear wheel coupled to the spool; a first pawl selectively engageable with the first gear wheel; a second gear wheel coupled to the spool; a second pawl selectively engageable with the second gear wheel; and a button, the button operatively connected to the first pawl and the second pawl such that in a first position the first pawl is engaged and the second pawl is disengaged and in a second position the first pawl is disengaged and a second pawl is engaged; wherein the first gear wheel and the second gear wheel are oriented in opposite directions such that engagement of the first pawl with the first gear wheel prevents rotation of the spool in a first direction and engagement of the second pawl with the second gear wheel prevents rotation of the spool in a second direction.

In a detailed embodiment of the fifth aspect, the retractor may further include an engagement element rotatable in relation to the frame and including the first pawl, wherein in the first position a tab on the button holds the engagement element in a disengaged position and in the second position the button allows a spring to rotate the engagement element such that the first pawl engages the second gear wheel.

These and other features and advantages of the present invention will become apparent to those skilled in the art upon consideration of the following detailed description of preferred embodiments exemplifying the best mode of carrying out the invention as presently perceived. The drawings are only to serve for reference and illustrative purposes, and are not intended to limit the scope of the invention.

BRIEF DESCRIPTION OF THE SEVERAL VIEWS OF THE DRAWINGS

The detailed description particularly refers to the accompanying figures in which.

DETAILED DESCRIPTION

Figure 1:
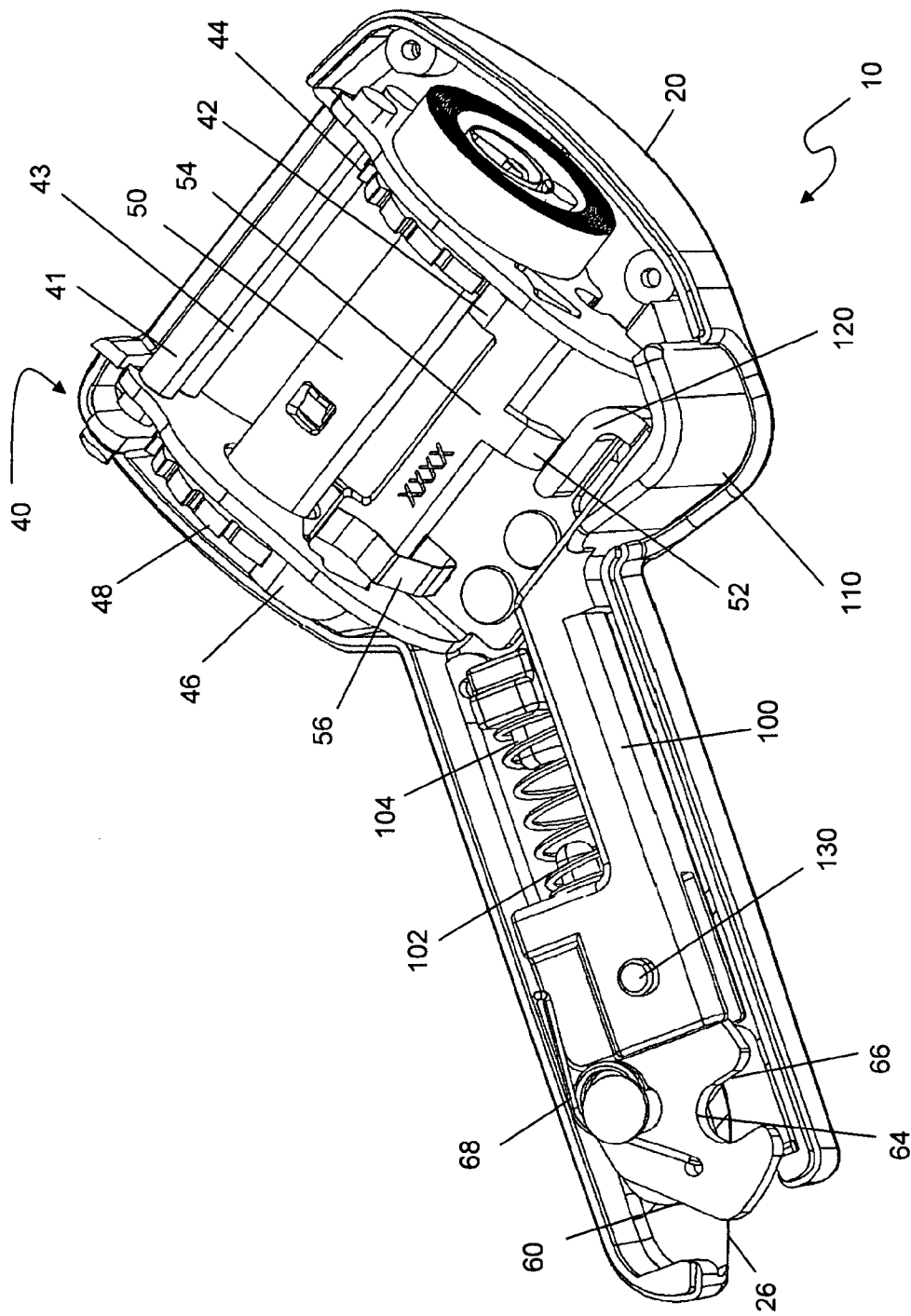
FIG. 1 is an isometric view of an exemplary embodiment of the present invention connection device with the top cover and connector frame removed.

As shown in FIG. 1, an exemplary embodiment of the present invention connection device 10 is comprised of a cover 20 containing a webbing retractor 40 and a connector 60. The cover 20 is preferably comprised of two portions that join together to form a shell.

The retractor 40 preferably includes a center shaft 50 adapted to function as a spool for receiving a length of webbing. The center shaft 50 is preferably coupled to a torsion spring such that the torsion spring opposes rotation of the center shaft 50 in the unwinding direction. The torsion spring exerts a torque on the main shaft in the wind direction such that any slack webbing is pulled into the retractor and is wound around the center shaft 50. The center shaft is mechanically coupled to gear wheels 44, 48.

In an exemplary embodiment, the retractor 40 has two modes: "free-wheel" mode and "lock" mode. In lock mode, pawl 42 engages gear wheel 44 and pawl 46 engages gear wheel 48. In the exemplary embodiment, pawls 42 and 46 are integrally connected via bar 54; thus, pawls 42 and 46 together may be referred to as a single pawl. However, for purposes of clarity, pawls 42 and 46 are each mentioned throughout the description of the invention herein. When engaged, the pawls 42, 46 and gear wheels 44, 48 prevent the center shaft 50 from rotating in the unwind direction, thus preventing additional webbing from being extended from the retractor 40. Even when engaged, the pawls 42, 46 and the gear wheels 44, 48 permit the center shaft to rotate in the wind direction, thus allowing slack webbing to be wound onto the center shaft by the force of the torsion spring. As such, the retractor 40 operates as a ratchet while in lock mode: slack webbing is wound onto the center shaft 50 due to the action of the torsion spring because the pawls 42, 46 and gear wheels 44, 48 allow the center shaft 50 to rotate in the wind direction, but webbing cannot be unwound from the center shaft 50 because the pawls 42, 46 and gear wheels 44, 48 prevent it from rotating in the unwind direction. In other words, lock mode allows tightening of the webbing but does not allow loosening of the webbing. Stated another way, lock mode on the retractor does not allow webbing to pay out while at the same time allowing webbing to ratchet back into the retractor to get tighter.

In the free-wheel mode, pawls 42, 46 are disengaged from gear wheels 44, 48, thereby allowing the center shaft to rotate in both the unwind and wind directions. Webbing may be extended from the retractor by pulling with sufficient force to overcome the torsion spring and webbing can be returned to the retractor by allowing the torsion spring to wind it onto the center shaft 50.

In the exemplary embodiment, the webbing runs from the center shaft 50, between pins 41, 43, and out of the retractor 40. The pins 41, 43 are preferably spaced apart by the minimum distance that permits the webbing to slide freely between them. By locating the pins 41, 43 as such, the pins 41, 43 prevent any twists in the webbing to enter the retractor. To allow this close spacing, the exemplary embodiment is assembled by first installing one of the pins 41, then placing the webbing over the first pin 41, and finally the second of the two pins 43 is installed.

In the exemplary embodiment, pawls 42, 46 are mounted to bar 54, which also includes a tab 52. Spring 56 biases bar 54 such that pawls 42, 46 are engaged with the gear wheels 44, 48 when no external forces are applied. If tab 52 is pressed towards the center shaft 50, bar 54 pivots and thereby disengages the pawls 42, 44 from the gear wheels 44, 48.

In the exemplary embodiment, connector 60 is rotatable about stud 62. Connector 60 preferably includes an opening 64 with a locking surface 66. When the connector 60 is unlocked, the opening 64 is generally aligned with the triangular opening 26 in shell 20. The connector 60 also includes a spring 68 adapted to bias connector 60 towards its unlocked position.

In an exemplary embodiment, retractor 40 and connector 60 are interlocked by segment 100. Segment 100 includes release button 110, interface 120, and roller 130. Segment 100 is spring-biased towards the connector 60 by a helical compression spring located on nub 102 on segment 100 and nub 104 attached to the frame 22. Interface 120 is adapted to press against tab 52 when the release button 110 is depressed. Roller 130 is adapted to roll along the edge of connector 60. When connector 60 rotates into the locked position, the roller rolls into an indentation on the edge of connector 60, thereby preventing further rotation of connector 60.

Figure 2:
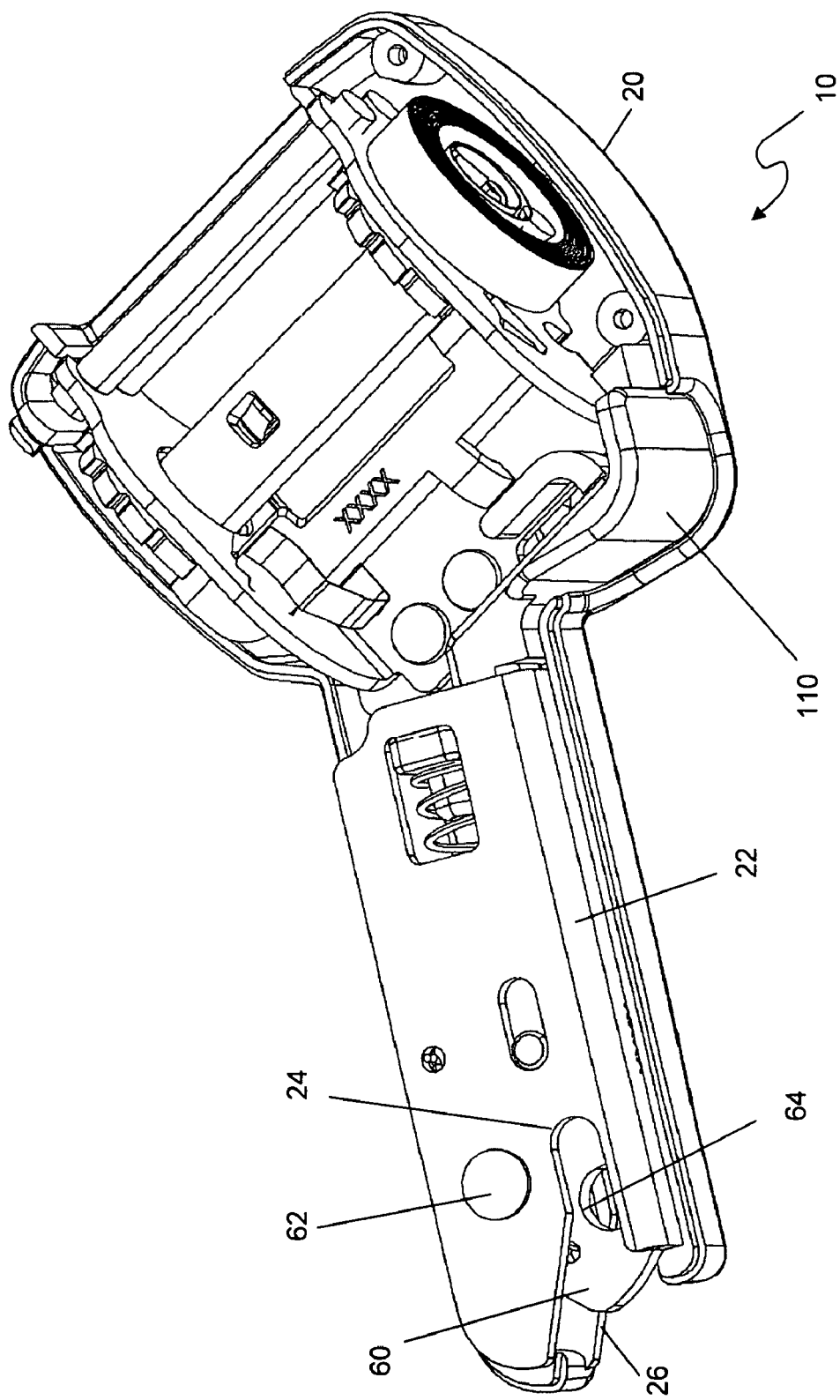
FIG. 2 is an isometric view of an exemplary embodiment of the present invention connection device with the top cover removed.

An exemplary embodiment of the connection device 10 is operated as follows. A user places the opening 64 of connector 60 over an attachment point. As the user slides the connector 60 over the attachment point, the attachment point pushes on locking surface 66, causing connector 60 to rotate about stud 62. The rotation of the connector captures the attachment point between opening 64 and slot 24 in frame 22. (See FIG. 2.) Additionally, the rotation of connector 60 causes roller 130 to roll into an indentation in connector 60. Once roller 130 is in the indentation, the attachment point is locked into the connector 60 because the connector 60 cannot freely rotate to allow the attachment point to leave the opening 64.

As the roller 130 rolls into the indentation in the connector 60, the helical compression spring mounted to nubs 102, 104 moves segment 100 towards the connector 60. As segment 100 moves towards the connector 60, the interface 120 moves away from tab 52, thereby allowing spring 56 to rotate bar 54 to engage the pawls 42, 46 with the gear wheels 44, 48. Engaging the pawls 42, 46 with the gear wheels 44, 48 places the retractor in lock mode. Additionally, the release button 110 moves toward the connector 60. At this point, the connection device 10 is in lock mode: the attachment point is locked into the connector 60 and the retractor 40 is in lock mode.

To release the connection device 10, the user depresses the release button 110. Depressing the release button 110 causes segment 100 to slide away from the connector 60, thereby moving roller 130 out of the indentation in connector 60. This permits spring 68 to rotate connector 60 to the unlocked position in which the attachment point can freely move out of the opening 64. Additionally, moving segment 100 away from the connector 60 causes interface 120 to press on tab 52, thereby rotating bar 54 such that pawls 42, 46 are disengaged from gear wheels 44, 48. Therefore, the retractor is in placed in free-wheel mode.

An exemplary embodiment of the connection device 10 is generally symmetrical across a plane extending from the center shaft 50 to the connector 60. The release button 110 is approximately bisected by this plane. As such, the connection device 10 is "non-handed," meaning that it can be operated by a user's right hand or left hand.

The connection device 10 may be used to attach a child restraint to a vehicle. In one application, the connection device 10 may be attached to one end of a length of webbing that passes through a portion of the child restraint. The other end of the webbing may be attached to a clip adapted to couple with an attachment point. To attach the child restraint to the vehicle, the user first attaches the clip to the attachment point on the vehicle adjacent to one side of the child restraint. Then the user couples the connection device 10 to the attachment point on the vehicle adjacent to the other side of the child restraint. The connection device 10 provides appropriate tension in the webbing and winds any excess webbing onto the center shaft 50 due to the action of the torsion spring.

Alternatively, the other end of the webbing may be attached to a second connection device 10. In this application, the user attaches one of the connection devices 10 to an attachment point and then attaches the other connection device 10 to another attachment point. Utilizing two connection devices 10, one on each end of a length of webbing that passes through a portion of the child restraint, is advantageous because the order of attachment of the connection devices does not matter. In another application, the connection device 10 is attached to a length of webbing, the other end of which is rigidly affixed to the child restraint.

Once the child restraint is attached to the vehicle using one or more connection devices 10, the ratcheting operation of the retractor 40 while in lock mode permits the webbing to be tightened simply by pressing the child restraint into the vehicle's seat cushion. Pressing the child restraint into the seat cushion creates slack in the webbing which is automatically wound onto the center shaft 50 of the retractor 40 by the action of the torsion spring. As discussed above, in lock mode the retractor 40 allows the webbing to wind onto the center shaft 50 but does not allow the webbing to unwind off of the center shaft 50 due to the ratcheting operation of the pawls 42, 46 and gear wheels 44, 48.

The various detailed embodiments described below are to be understood in the general context of the embodiment described above. Unless otherwise specified with respect to the detailed embodiments described below, the connection devices described below are constructed and operate in the manner described above.

Figure 3:
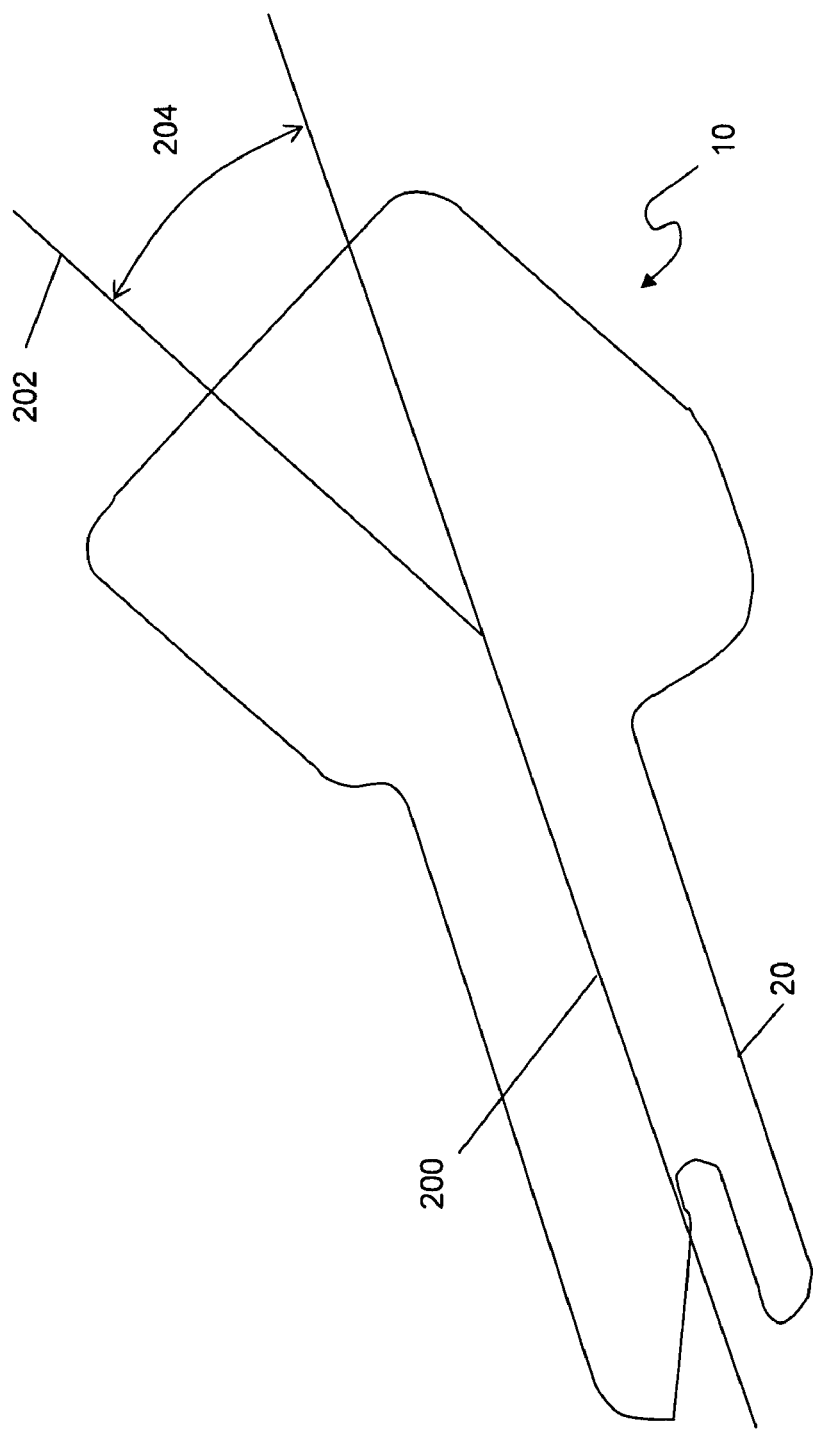
FIG. 3 is a plan view of an exemplary embodiment of the present invention showing the angular offset of the webbing and the connector.

FIG. 3 depicts a connection device 10 with covers 20 installed. The angular offset 204 of the centerline of the webbing 202 relative to the centerline of the connector 200 is apparent. The angular offset 204 is designed to optimize vehicle fit and webbing retraction. Preferred embodiments have angular offsets 204 within the range of 20-30 degrees; however, other embodiments may utilize angular offsets 204 as small as approximately 0 degrees and as large as approximately 45 degrees. In this exemplary embodiment, the angular offset 204 lies in a plane generally parallel to the plane of the surface of the webbing at the point at which it exits the retractor. It is within the scope of the invention to offset the connector and retractor in other directions. For example, the angular offset between the connector and the webbing could be in a direction generally perpendicular to the plane of FIG. 3. In addition, the angular offset may be such that the webbing and connector are offset in two directions, such as shown in FIG. 3 as well as in the direction perpendicular to the plan of FIG. 3.

Figure 4:
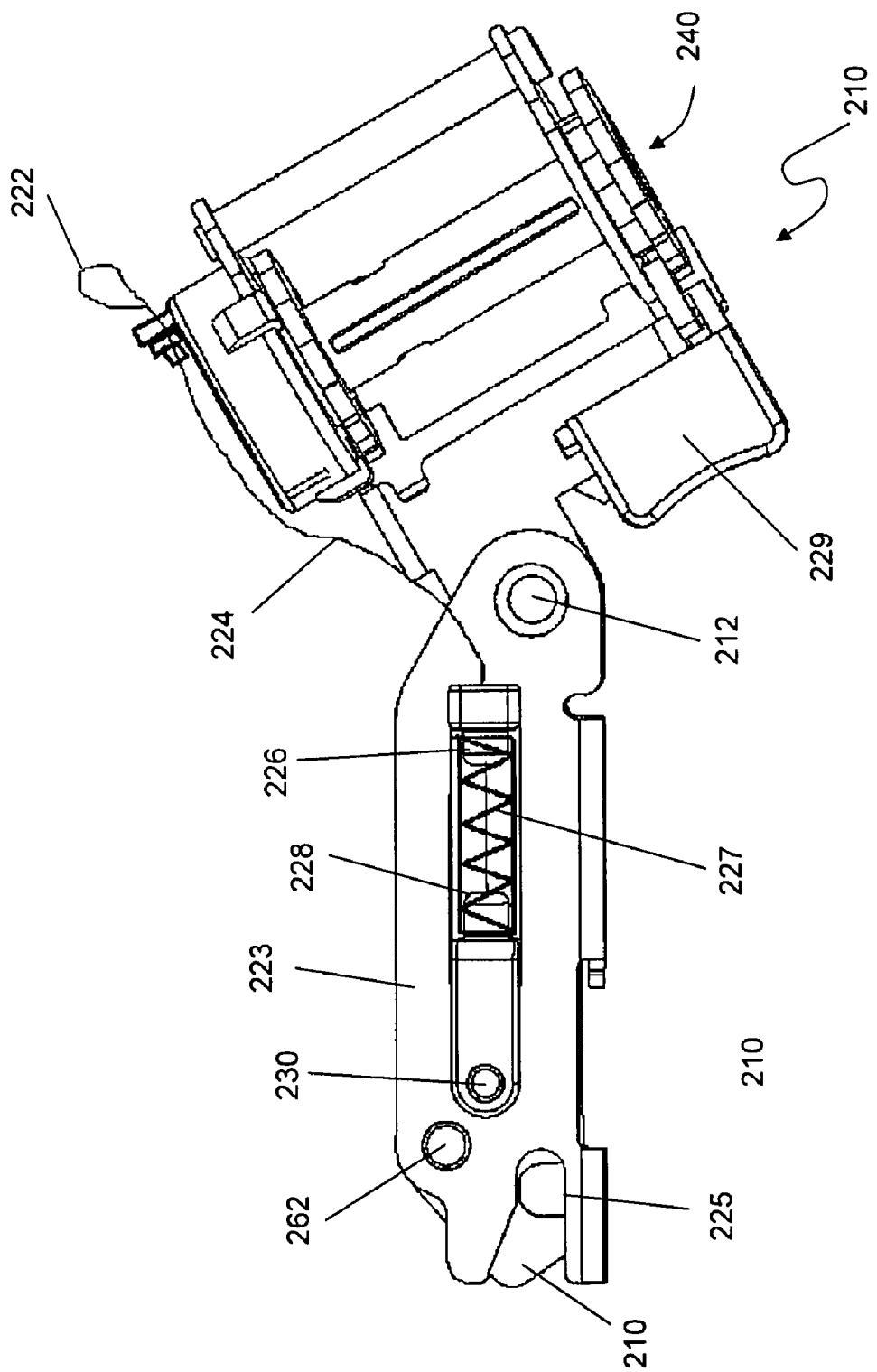
FIG. 4 is a plan view of an exemplary embodiment of the present invention including a pivot joint and a cable release.

FIG. 4 depicts an alternative embodiment of the present invention connection device 210 incorporating a pivot joint 212 between the frame 223 and the retractor 240. In this exemplary embodiment, pivot joint 212 allows the connection device 210 to articulate in a plane generally parallel with the flat surfaces of the webbing at the point where the webbing leaves the retractor 240. This is also generally the same plane in which connector 260 rotates about stud 262. The pivot joint 212 may allow relatively free articulation or, alternatively, may impose significant frictional forces opposing articulation. Although the exemplary embodiment incorporates a pin joint, other means of allowing articulation are within the scope of the invention. It is also within the scope of the invention to allow articulation in an alternative or additional direction.

FIG. 4 also depicts an alternative release mechanism embodiment of the present invention employing a cable release. Although FIG. 4 depicts an embodiment including both the pivot joint 212 and cable release features, it is within the scope of the invention to utilize the pivot joint 212, the cable release, or both on the same connection device 210. The cable release includes a handle 222, a length of cable 224, a slidable connection 226, and a fixed connection 228. The fixed connection 228 is rigidly attached to roller 230 via a linkage, which is slidable in relation to the connector 260 and frame 223. The cable 224 is rigidly attached to the fixed connection 228 and can slide through slidable connection 226. Slidable connection 226 is fixed in position relative to frame 223. It is within the scope of the invention to locate the various components of the cable release mechanism on different portions of the connection device. It is also within the scope of the invention to utilize a cable release mechanism for shifting the mode of the retractor.

In this exemplary embodiment, connector 260 interacts with roller 230 in generally the same way as described above with regard to connection device 10 with the exceptions that segment 110 is replaced with cable 224 and the button 110 is replaced with handle 222. In essence, a user can release the connection device 210 from an attachment point by pulling on handle 222. The handle 222 pulls on cable 224 which pulls on fixed connection 228. Fixed connection 228 moves against the force of spring 227 to withdraw roller 230 from an indentation in connector 260, thus allowing a spring attached to a nub (as described above) to rotate the connector 260 to the unlocked position about stud 262. As the connection device 210 is coupled to an attachment point, connector 260 pivots into the locked position as depicted in FIG. 4. This allows roller 230 to slide into the indentation, thus locking the connector 260 in the locked position as shown in FIG. 4. In the locked position, the connector 260 and the slot 225 retain a portion of the attachment point, thus coupling the connection device 210 to the attachment point. In this embodiment, the retractor 240 may include a button 229 for switching the mode of the retractor 240 between free wheel mode and lock mode.

Figure 5:
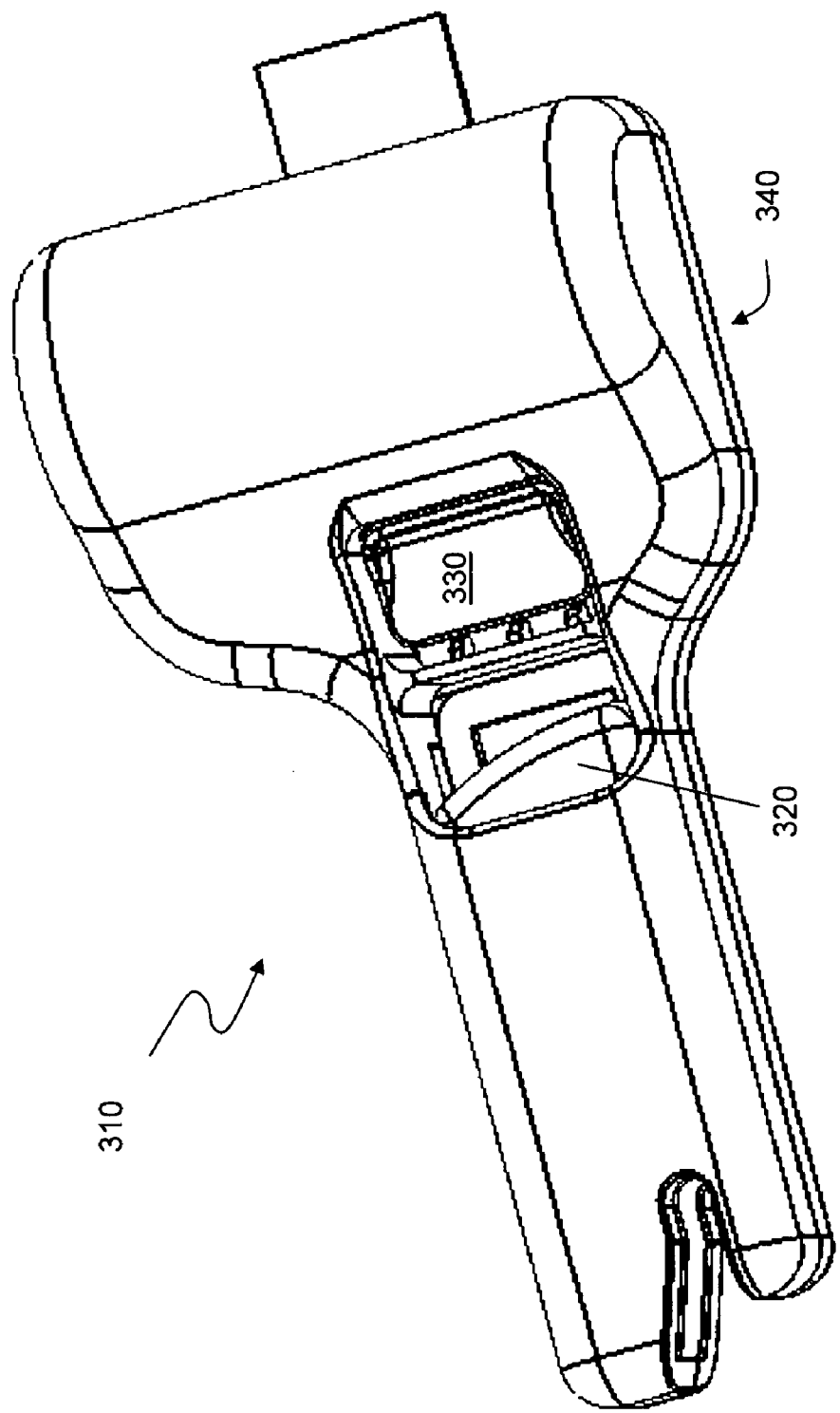
FIG. 5 is an isometric view of an exemplary embodiment of the present invention including two release buttons.
Figure 6:
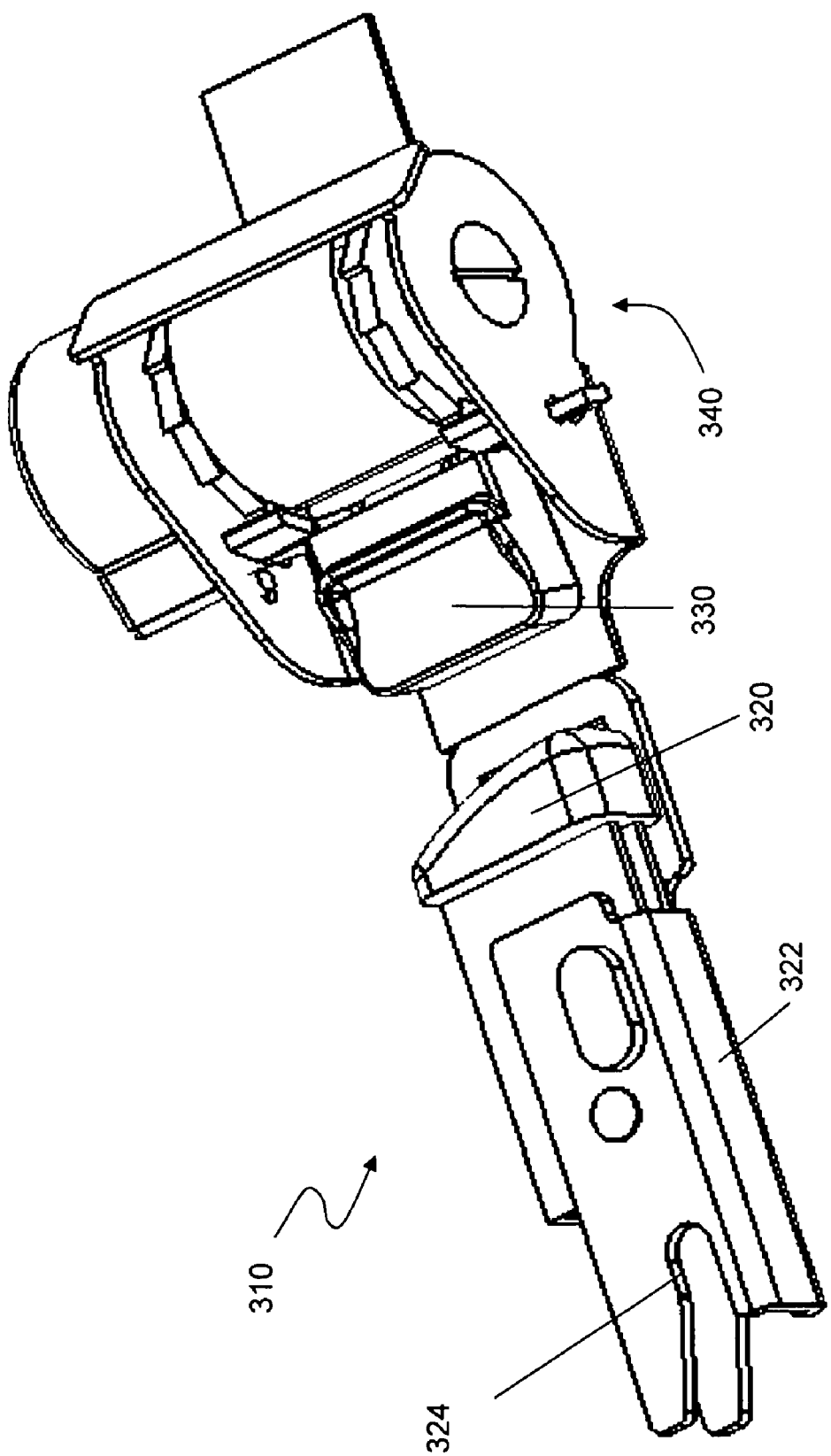
FIG. 6 is an isometric view of an exemplary embodiment of the present invention including two release buttons with the cover removed.

FIGS. 5 and 6 depict an exemplary embodiment of the present invention connection device 310 including separate release buttons 320, 330 for the retractor 340 and the connector, respectively. As shown in FIG. 6, connection device 310 is constructed and operates generally similarly to connection device 10 described above with the exception that two releases buttons are utilized. In this embodiment, depressing the retractor release button 330 causes the retractor to shift from lock mode to free wheel mode as described above. Depressing connector release button 320 causes the connector to release from the attachment point. Connector release button 320 is located adjacent to and slidable in relation to the frame 322, which includes a slot 324 corresponding to the slot 24 described above with regard to connection device 10.

Figure 7:
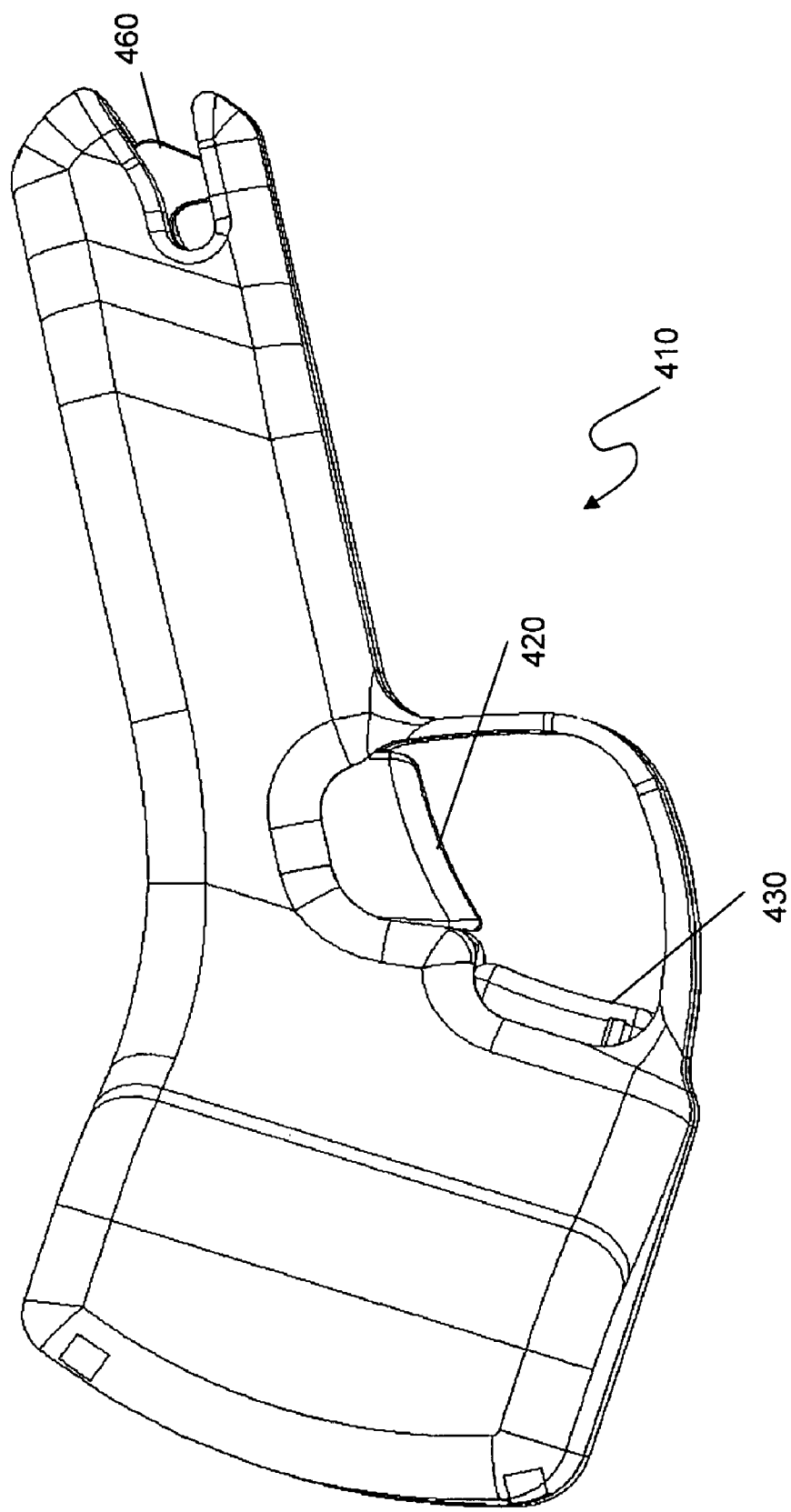
FIG. 7 is a plan view of an exemplary embodiment of the present invention including two release buttons.
Figure 8:
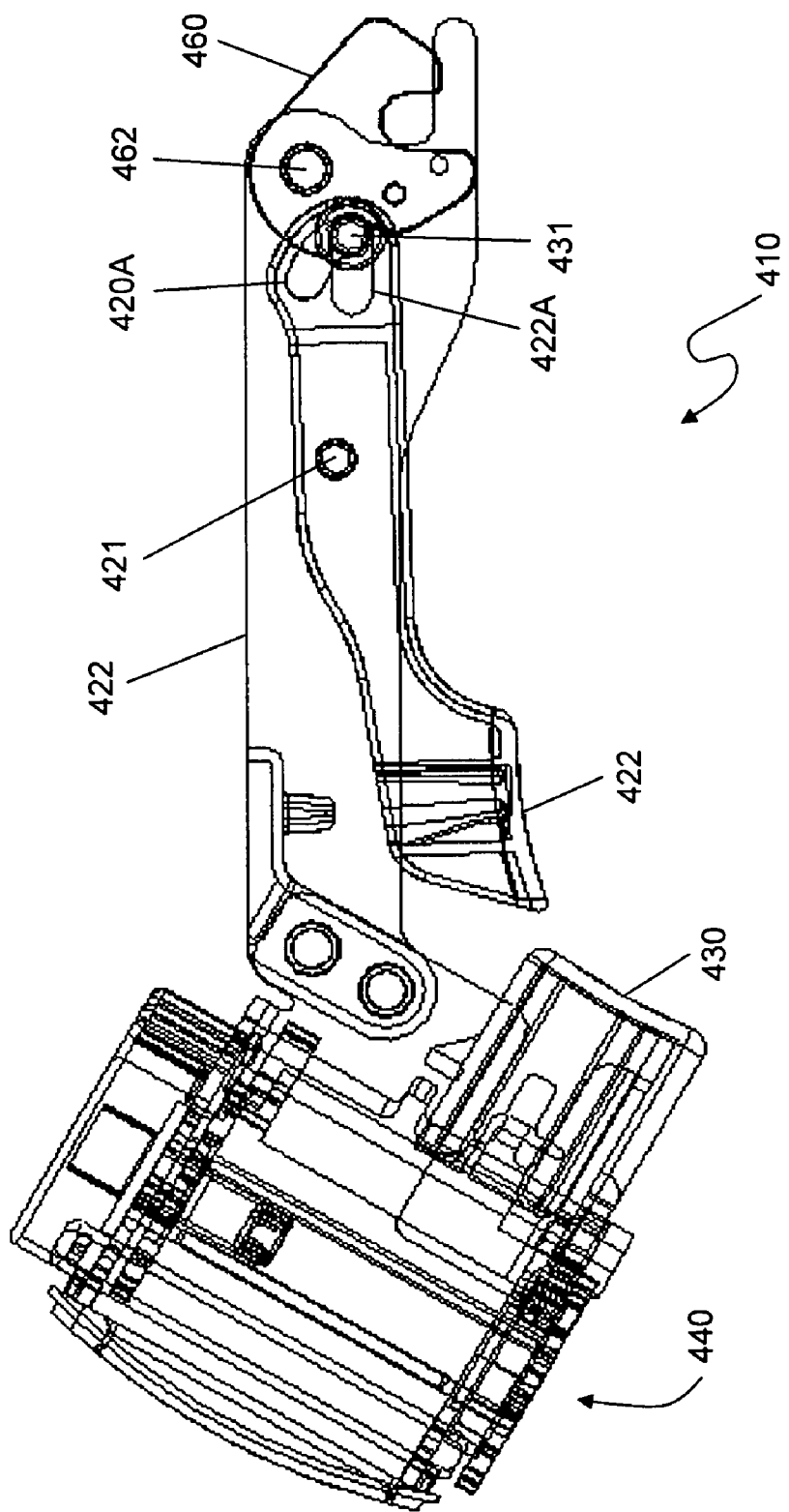
FIG. 8 is a plan view of an exemplary embodiment of the present invention including two release buttons with the cover removed.

FIGS. 7 and 8 depict another exemplary embodiment of the present invention connection device 410 including separate release buttons 420, 430 for the retractor 440 and connector 460. As shown in FIG. 8, connection device 410 is constructed and operates generally similarly to connection device 10 described above with the exceptions that two release buttons are utilized and the device includes an alternative retractor 440 as described below. In this embodiment, connector release button 420 is elongated and pivots about point 421. The connector release button also includes a slot 420A in which roller 431 is slidable. Roller 431 is also slidable in slot 422A in frame 422. As is apparent from FIG. 8, the relative angle of connector release button 420 and frame 422 determines the position of roller 431 in slot 422A because slot 420A decreases in radius relative to pivot 421 as the connector release button 420 is depressed. Thus, depressing the connector release button 420 causes roller 431 to move in slot 422A in frame 422 towards the retractor 440. This movement withdraws roller 431 from an indentation in connector 460 in a manner similar to that described above with regard to connection device 10. Accordingly, connector 460 pivots about stud 462, thereby releasing the attachment point.

Figure 9:
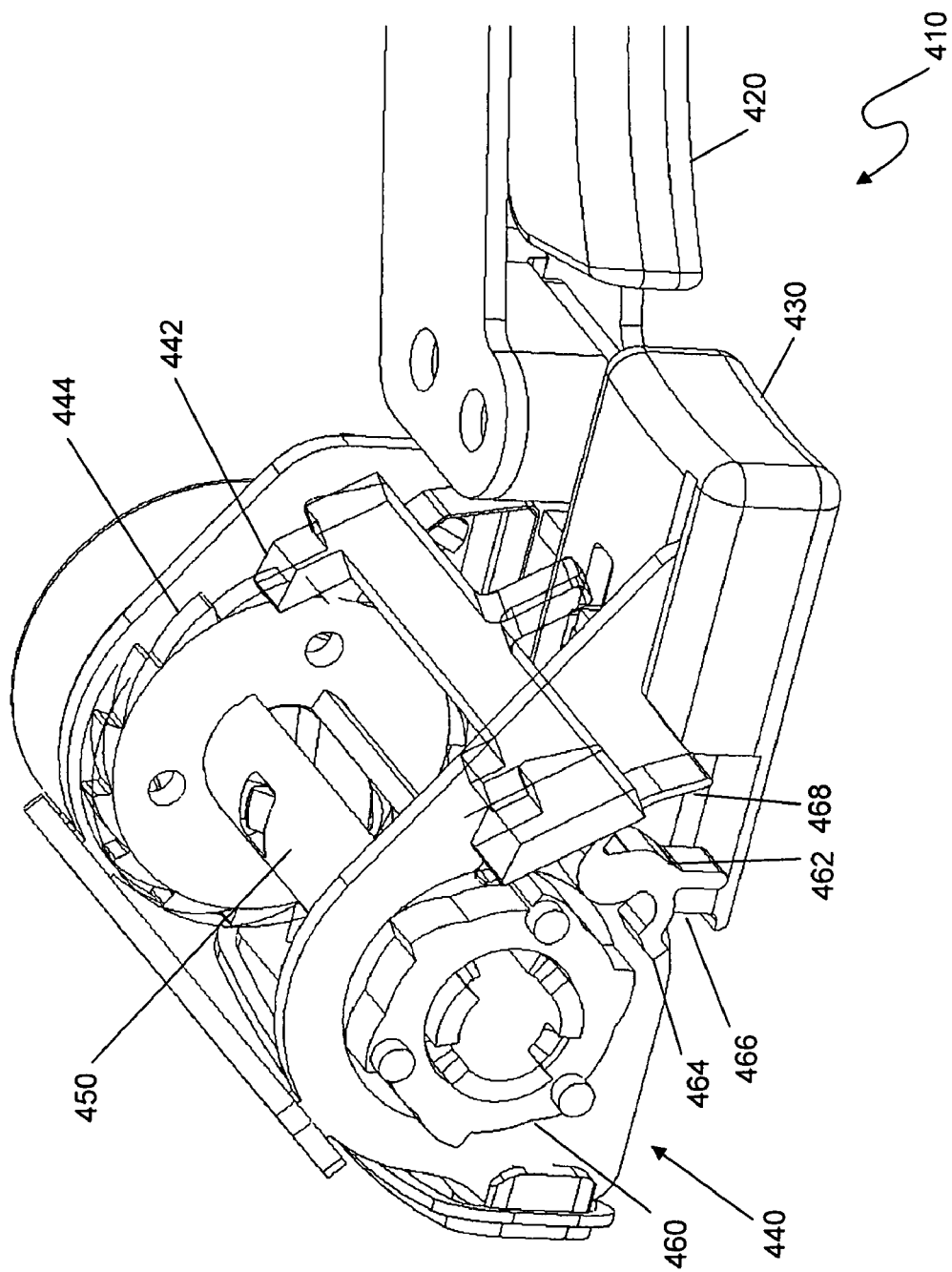
FIG. 9 is a detailed isometric view of an exemplary embodiment of a retractor having a park mode.

FIG. 9 shows a detailed view of an alternative exemplary embodiment of a retractor 440. A retractor including one or more of these features may be used on other connection devices described herein, although it is depicted as included in the connection device 410 shown in FIGS. 7 and 8. The retractor includes a center shaft 450 which acts as a spool for winding webbing. Gear wheel 444 and pawl 442 cooperate to provide a ratcheting mode which allows webbing to retract onto the center shaft 450 due to the action of a torsion spring while not allowing webbing to be withdrawn from the retractor 440. This ratcheting mode is generally equivalent to the lock mode described above with regard to connection device 10. Pawl 442 may be rotated out of engagement with gear wheel 444 by the action of button 430. The button 430 is spring biased in the direction away from the retractor and generally towards the connector 460. A user may disengage the pawl 442 from the gear wheel 444 by pressing button 430 towards the center shaft 450.

Depressing button 430 also actuates park mode of the retractor. In the park mode, spring finger 468 causes park element 462 to rotate, thereby engaging pawl 464 with reverse toothwheel 460. When the pawl 464 is engaged with the reverse toothwheel 460, webbing can be withdrawn from the retractor but will not be automatically retracted by the action of the torsion spring. Pawl 464 and reverse toothwheel 460 act as a ratchet, allowing rotation in the unwind direction only when pawl 464 is engaged. When the user releases button 430, tab 466 on button 430 rotates the park element such that pawl 464 is taken out of engagement with reverse toothwheel 460 and the retractor is free to rotate in the wind direction.

Figure 10:
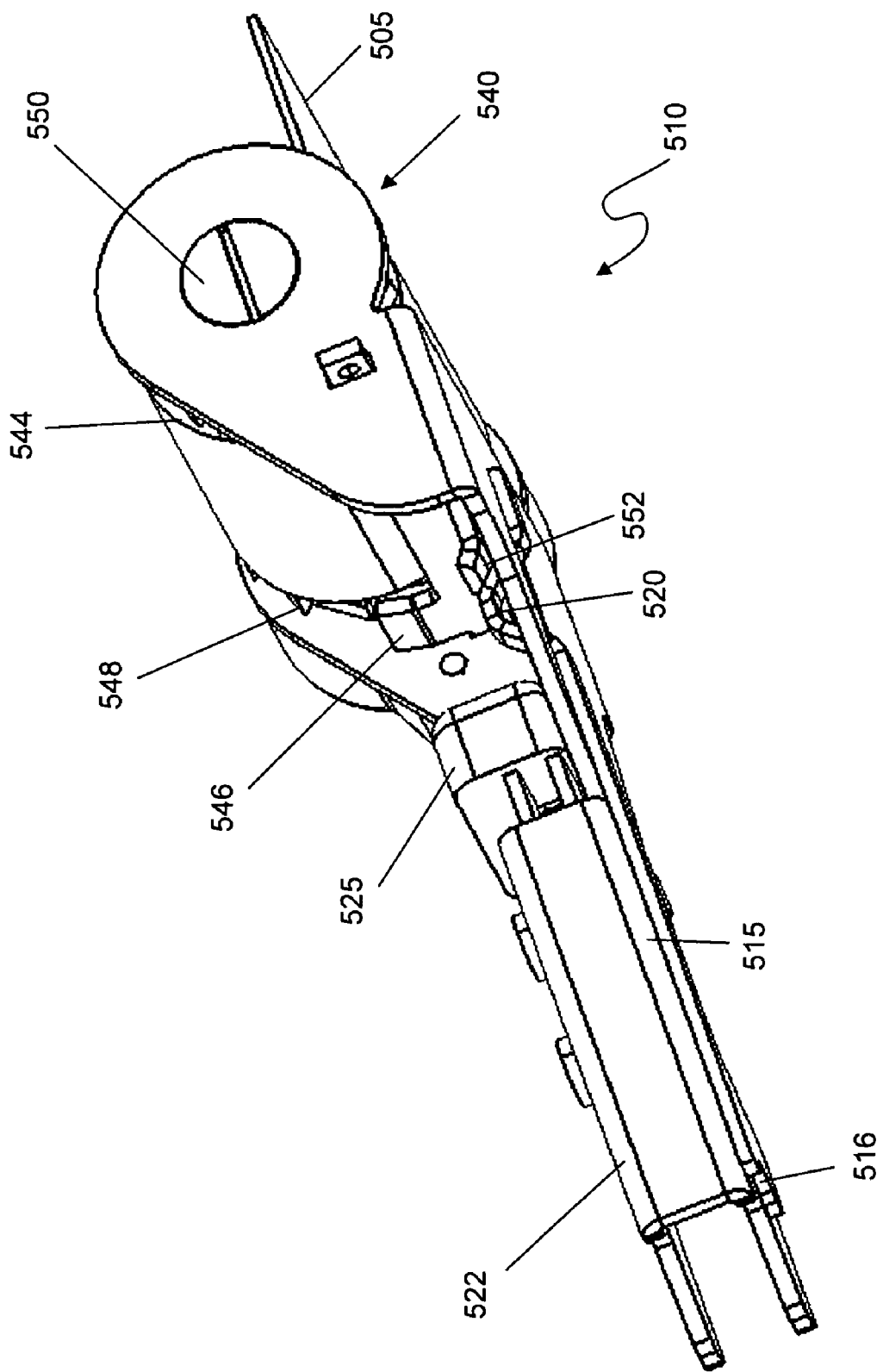
FIG. 10 is an isometric view of an exemplary embodiment of the present invention including an alternative retractor pawl actuation method.
Figure 11:
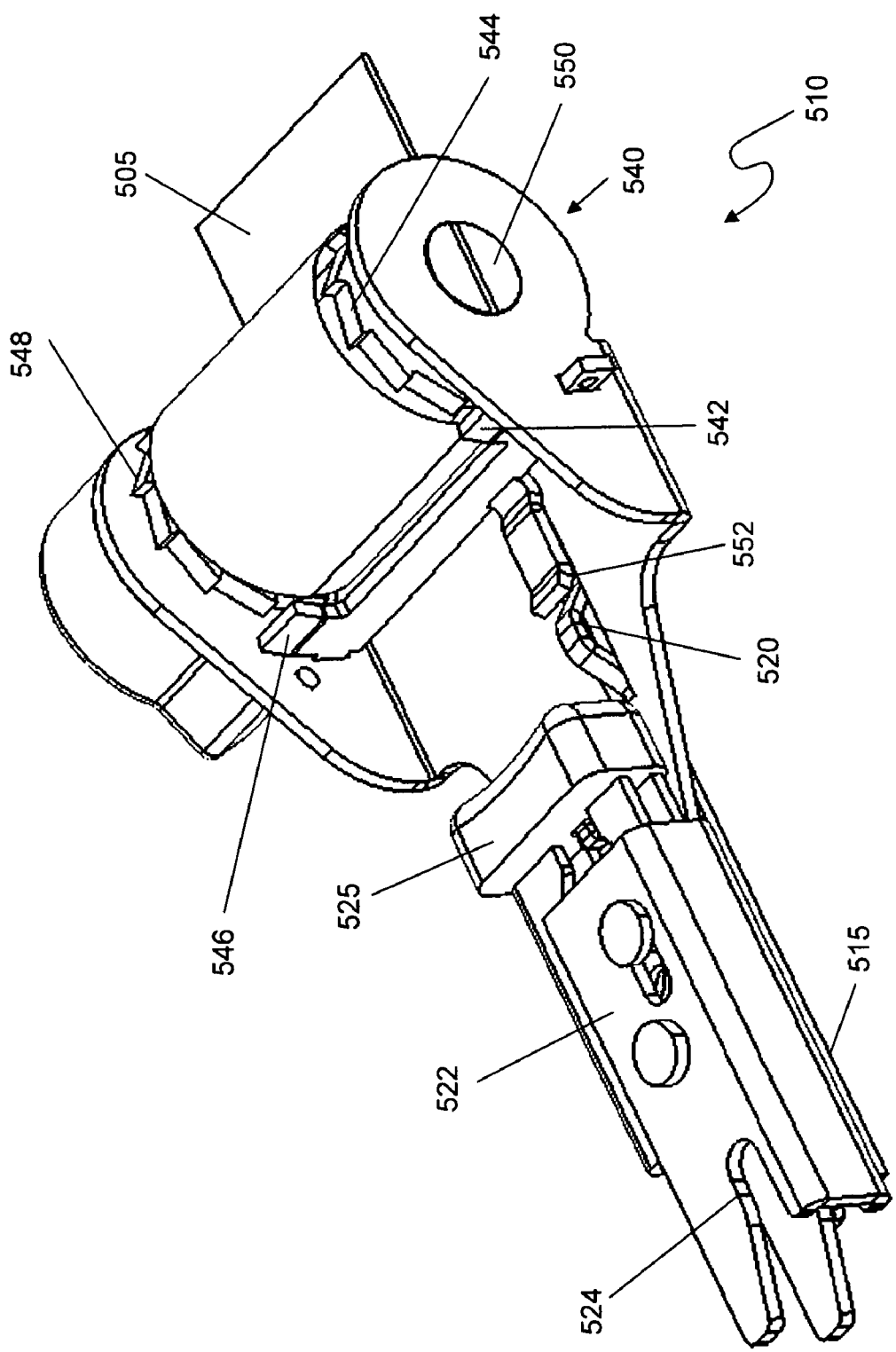
FIG. 11 is an isometric view of an exemplary embodiment of the present invention including an alternative pawl actuation method.

FIGS. 10 and 11 depict an alternative retractor pawl actuation mechanism. Actuator 515 is slidably connected to frame 522 and includes an interface 520. The interface acts on tab 552 which is attached to pawls 544 and 546 in a manner similar to that described above with regard to connection device 10. The actuator 515 is spring biased in the direction towards the connector end of the connection device 510. Actuator 515 includes a notch 516 that interfaces with the portion of the attachment point which is retained in slot 524 when the connection device 510 is coupled to the attachment device As the connection device 510 is coupled with the attachment point, the attachment point slides into slot 524. As it does so, the attachment point presses on notch 516 and pushes actuator 515 towards the retractor 540. This movement causes interface 520 to press on tab 552 and engage the pawls 542, 546 with the gear wheels 544, 548, thus placing the retractor in the lock mode. The lock mode allows webbing 505 to be retracted onto the center shaft 550 but does not permit webbing to be withdrawn from the retractor. This embodiment employs a connector release button 525 that releases the attachment point from the connector when the button 525 is pressed in the direction away from the retractor 540 and towards the connector.

Figure 12:
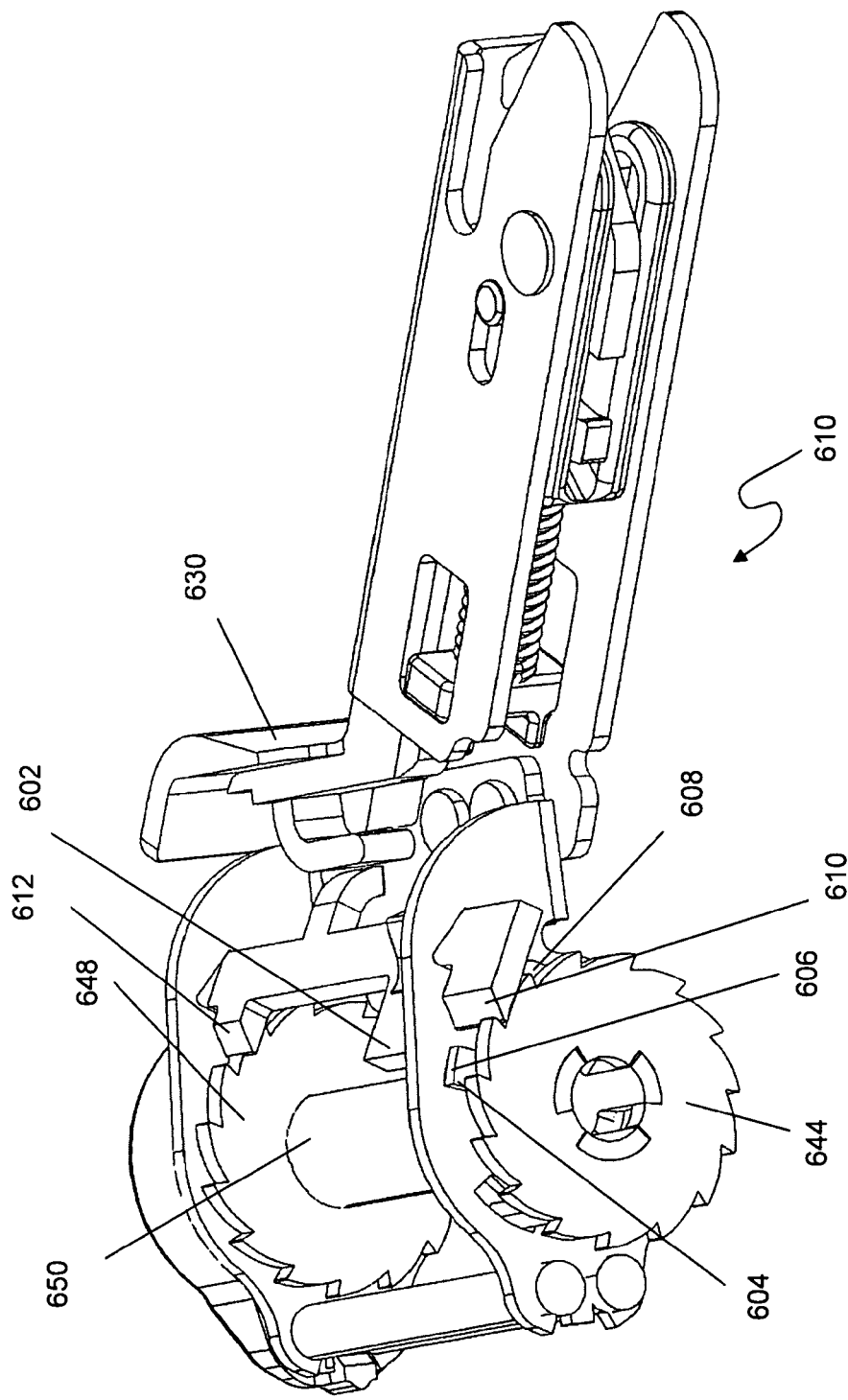
FIG. 12 is an isometric view of an exemplary embodiment of the present invention including an automatic locking retractor.

FIG. 12 depicts another exemplary embodiment 610 of the invention including an automatic locking retractor (ALR). This embodiment includes two gear wheels 644, 648 that may engaged by pawls 610, 612. Pawls 610, 612 are disengaged from gear wheels 644, 648 when substantially all of the webbing is wound around spool 650, which lifts pawl paddle 602. Once pawl paddle 602 is lifted by the webbing on spool 650, the pawls 610, 612 are disengaged from gear wheels 644, 648 and webbing may be freely withdrawn from the retractor.

Clutch plate 604 including cams 606 and 608 is coupled to spool 650 via a spring. As the webbing is withdrawn, clutch plate 604 rotates such that cam 606 engages pawl 610, thereby preventing pawls 610, 612 from engaging gear wheels 644, 648. If a small amount of webbing is permitted to be retracted onto spool 650, clutch plate 604 rotates. This action disengages cam 606 from pawl 610, thus allowing pawls 610, 612 to engage gear wheels 644, 648. When pawls 610, 612 are engaged with gear wheels 644, 648, withdrawal of additional webbing from the retractor is inhibited. Cam 608 is optionally included on clutch plate 604 to prevent a clicking sound as the ratchet operates.

While each of the embodiments described above employs a particular combination of novel features, it is within the scope of the invention to provide a connection device incorporating any one or more of the above-described features, including combinations of said features not specifically described herein. While preferred embodiments of the invention have been set forth above for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A connection assembly for a child restraint seat comprising:
    a connector for releasably coupling a connection device to a vehicle attachment point;
    a retractor including a rotatable spool;
    a frame separable from a child restraint seat, the frame including a handle at least partially housing the connector;
    a length of webbing mounted to and extending from the child restraint seat, the length of webbing at least partially wound around the spool;
    a push button actuator having a first position that concurrently allows rotation of the rotatable spool and disengagement of the connector from the vehicle attachment point, and a second position that inhibits rotation of the rotatable spool and inhibits disengagement of the connector from the vehicle attachment point;
    wherein the connection assembly is operative to couple the child restraint seat to a vehicle using the vehicle attachment point provided within a passenger compartment of the vehicle;
    wherein the connection device includes the connector, the retractor, and the frame;
    wherein the connection device is separate from the child restraint seat and extends between the child restraint seat and the vehicle attachment point; and
    wherein the connector and the retractor are mounted to the frame.

2. The connection assembly of claim 1, wherein the connector is rigidly coupled to the retractor.

3. The connection assembly of claim 1, wherein the retractor and the connector are encased within a shell separate from the child restraint seat and the length of webbing extends from the child restraint seat, through an opening in the shell, and to the retractor.

4. The connection assembly of claim 1, further comprising a ratchet mechanism, the ratchet mechanism being operatively coupled to the retractor.

5. The connection assembly of claim 4, wherein the ratchet mechanism includes at least one pawl selectively engageable with at least one ratchet wheel such that the ratchet mechanism permits extension of the length of webbing from the retractor only when the at least one pawl is disengaged from the at least one ratchet wheel, the at least one pawl disengaging from the at least one ratchet wheel when the length of webbing is fully retracted into the retractor and the at least one pawl engaging the at least one ratchet wheel after the length of webbing partially retracts into the retractor after being at least partially extended from the retractor.

6. The connection assembly of claim 5, further comprising a pawl paddle and a clutch plate having a cam, the pawl paddle being mounted adjacent to the spool such that the pawl paddle is moved to an open position by webbing accumulating on the spool when substantially all of the length of webbing is retracted onto the spool, the cam being operable to hold the pawl paddle in the open position while a portion of the length of webbing is withdrawn from the retractor and the cam disengaging from the pawl paddle and allowing the pawl paddle to shift to a locked position when the length of webbing is partially retracted onto the retractor; wherein the pawl paddle is connected to the pawl and the pawl is disengaged from the ratchet wheel when the pawl paddle is in the open position and the pawl is engaged with the ratchet wheel when the pawl paddle is in the locked position.

7. The connection assembly of claim 1, wherein the connector is articulable relative to the retractor about a joint located between the connector and the retractor.

8. The connection assembly of claim 7, wherein a centerline of the connector is between 0 and 45 degrees offset from a centerline of the webbing when wound around the rotatable spool.

9. The connection device of claim 1, wherein the retractor further includes a first pin and a second pin, the first pin and the second pin being located such that the length of webbing extends from the spool, between the first pin and the second pin, and out of the retractor, wherein a distance between the first pin and the second pin is equal to a minimum spacing required to permit a single thickness of the webbing to slide freely between the first pin and the second pin.

10. A connection device for mounting a child restraint seat to a vehicle comprising:
a connection device including a housing separate from the child restraint seat, the housing at least partially containing a retractor including a rotatable spool, the housing also including a handle that at least partially contains a first connector for releasably coupling the connection device to a first attachment point within a passenger compartment of a vehicle, the housing at least partially containing a repositionable button concurrently engaging the retractor and the first connector, wherein actuation of the button concurrently allows rotation of the rotatable spool and allows the first connector to disengage from the first attachment point, wherein a longitudinal axis extending through the handle is obliquely oriented with respect to a longitudinal axis extending through a portion of the housing containing the retractor, and wherein the longitudinal axes lie within the same plane.

11. The connection assembly of claim 10, wherein the retractor is operable in a plurality of modes of operation, the modes of operation including a free-wheel mode and a lock mode, wherein in the free-wheel mode the retractor permits the portion of the length of webbing to be readily extended from the spool and in the lock mode the retractor prevents webbing from being extended from the spool.

12. The connection assembly of claim 11 further comprising an interlock, the interlock being operative to change the mode of operation of the retractor from the free-wheel mode to the lock mode when the first connector is coupled to the first attachment point.

13. The connection assembly of claim 10, wherein the length of webbing has a first surface, a second surface, a first edge, and a second edge, and wherein the first connector is generally symmetric about a line extending from the first edge of the length of webbing to the second edge of the length of webbing.

14. The connection assembly of claim 10, wherein the retractor further includes a first pin and a second pin, the first pin and the second pin being located such that the length of webbing extends from the spool, between the first pin and the second pin, and out of the retractor, wherein a distance between the first pin and the second pin is equal to a minimum spacing required to permit a single thickness of the webbing to slide freely between the first pin and the second pin.

15. The connection assembly of claim 10, wherein the first connector is articulable relative to the retractor about a joint located between the first connector and the retractor.

16. The connection assembly of claim 10, wherein a the longitudinal axis of the connector is between 0 and 45 degrees offset from a the longitudinal axis of the length of webbing.

17. The connection device of claim 10 further comprising a second connector; wherein the length of webbing has a first end and a second end; the spool is adapted to receive a portion of the length of webbing including the first end; and the second connector is adapted to releasably couple the second end of the length of webbing to a second attachment point.

18. The connection device of claim 17, wherein the attachment point and the second attachment point are located within the vehicle proximate to both a seat portion and a seatback portion of a seat.

19. The connection device of claim 18, wherein the length of webbing between the retractor and the second connector passes through a portion of a child restraint.

20. The connection device of claim 10, wherein the retractor further includes a first pin and a second pin, the first pin and the second pin being located such that the length of webbing extends from the spool, between the first pin and the second pin, and out of the retractor, wherein a distance between the first pin and the second pin is equal to a minimum spacing required to permit a single thickness of the webbing to slide freely between the first pin and the second pin.

21. A stand-alone connection device apart from a child restraint seat comprising:
a housing including a retractor portion containing a retractor, the retractor including a spool receiving a length of webbing, the retractor portion having a centerline oriented in a direction along which the webbing is withdrawn from the retractor; and
a connector contained within a handle of the housing for releasably coupling the connection device to a vehicle attachment site, the handle having a longitudinal centerline; and
a release mechanism operatively coupled to the retractor and the connector, the release mechanism including an actuator repositionable to concurrently allow rotation of the rotatable spool and disengagement of the connector from the vehicle attachment site;
wherein the longitudinal centerline of the handle is between 0 and 45 degrees offset from the centerline of the retractor portion.

22. The connection device of claim 21, wherein the longitudinal centerline of the handle is between 20 and 30 degrees offset from the centerline of the retractor portion.

23. A stand-alone device to mount a child safety seat to a vehicle comprising:
   a housing including a head extending from an elongated handle, the head at least partially containing a retractor including a rotatable spool for releasably coupling the device to a child safety seat by way of a belt that is mounted to the child safety seat, and the handle at least partially containing a connector for releasably coupling the device to a vehicle attachment site; and,
   a release mechanism operatively coupled to the retractor and the connector the release mechanism including an actuator repositionable to concurrently allow rotation of the rotatable spool and disengagement of the connector from the vehicle attachment site.

* * * * *